United States Patent
Zhang et al.

(10) Patent No.: US 12,348,985 B2
(45) Date of Patent: Jul. 1, 2025

(54) ENERGY EFFICIENCY OPTIMIZATION METHOD FOR IRS-ASSISTED NOMA THz NETWORK

(71) Applicant: Dongguan University Of Technology, Guangdong (CN)

(72) Inventors: Guobin Zhang, Guangdong (CN); Han Chen, Guangdong (CN); Haibin Li, Guangdong (CN); Pengcheng Zhu, Guangdong (CN)

(73) Assignee: Dongguan University Of Technology, Guangdong (CN)

( * ) Notice: Subject to any disclaimer, the term of this patent is extended or adjusted under 35 U.S.C. 154(b) by 542 days.

(21) Appl. No.: 17/882,620

(22) Filed: Aug. 8, 2022

(65) Prior Publication Data
US 2023/0413069 A1    Dec. 21, 2023

(30) Foreign Application Priority Data

Jun. 15, 2022   (CN) .......................... 202210680248.1

(51) Int. Cl.
| | | |
|---|---|---|
| G06N 3/08 | (2023.01) | |
| H04B 7/145 | (2006.01) | |
| H04L 5/00 | (2006.01) | |
| H04W 24/02 | (2009.01) | |
| H04W 52/14 | (2009.01) | |
| H04W 52/24 | (2009.01) | |

(52) U.S. Cl.
CPC ............ *H04W 24/02* (2013.01); *H04B 7/145* (2013.01); *H04L 5/0005* (2013.01); *H04W 52/143* (2013.01); *H04W 52/242* (2013.01)

(58) Field of Classification Search
CPC ............ G06N 3/08; G06N 20/00; G06N 3/02; G06N 7/00; G06N 3/067; G06N 7/01; G06N 3/044; G06N 3/092; G06N 5/00; G06N 3/042; G06N 3/0442; G06N 3/049; G06N 3/098
See application file for complete search history.

(56) References Cited

FOREIGN PATENT DOCUMENTS

WO    WO-2022010012 A1 *    1/2022    .......... H01Q 21/061

* cited by examiner

*Primary Examiner* — Tu X Nguyen
(74) *Attorney, Agent, or Firm* — JEEN IP LAW, LLC

(57) ABSTRACT

An energy efficiency optimization method for an IRS-assisted NOMA THz network comprises: classifying users into BS users and IRS users; defining a channel model for the BS users and a channel model for the IRS users; calculating a BS user rate and an IRS user rate respectively, and calculating a total rate of a system; proposing an optimization problem for downlink power control and IRS phase shift adjustment; and solving the optimization problem through an MADRL method. The invention puts forward an energy efficiency concept and adopts an MADRL method to maximize the overall energy efficiency of the system under the constraints of minimum rate and maximum power of each user.

9 Claims, 2 Drawing Sheets

ENERGY EFFICIENCY OPTIMIZATION METHOD FOR IRS-ASSISTED NOMA THz NETWORK

BACKGROUND OF THE INVENTION

The invention relates to a network energy efficiency optimization method, in particular to an energy efficiency optimization method for an IRS-assisted NOMA THz network, and belongs to the technical field of communication.

The demand for an ultra-high data rate of information and entertainment grows rapidly in current and future wireless communication. However, the available spectrum resources are far from supporting the increasing data rate, which makes it urgent to explore new broadband to break through the spectrum bottleneck. Therefore, Terahertz (THz) band attracted wide attentions of the academic and industrial communities with its broadband characteristics, and considered as the basic technology of the sixth-generation (6G) mobile communications. THz wave refers to the frequency of 0.1-10 THz and its available bandwidth is more than tens time of the millimeter wave. Its peak data rate is expected to 1-10 TBits/s. Owing to the advantages of narrow beam and large communication capacity, THz band provides more potentials to achieve ultra-high wireless transmission rate. However, due to the high frequency and small wavelength, the diffraction and penetration ability of THz wave is worse than microwave and millimeter wave, which makes it easier to be blocked by obstacles.

Due to the intense attenuation performance, THz band is only suitable for short-distance communication scenarios, such as shopping malls, subway stations and other indoor places. The THz applications in outdoor communications require a lot of relay equipment. Therefore, some scholars propose to combine THz technology with intelligent reflecting surface (IRS) to make the transmission more efficient. IRS is a kind of reflecting surface composed of a large number of passive reflecting components. Each component can adjust its angle to reflect the signal independently. The intelligent reflector can be placed on the surface of the buildings, which effectively reflects the indoor and outdoor signals. Many studies have focused on the IRS-assisted communication by THz band.

THz wave has wide bandwidth with more latent users and equipments such as mobile users, industrial users and intelligent health-care terminals. However, the THz band has a major defect of small coverage, which is caused by severe attenuation of THz signals. This defect will lead to a heavy transmission burden and result in a rapid increase of energy consumption. Non-orthogonal multiple access (NOMA) is a promising wireless communication technique, which allows users to share the same sub-channel simultaneously and their communication resources through a power domain or a code domain. Compared with traditional orthogonal multiple access, NOMA is an effective technique for improving spectral efficiency and realizing mass wireless network connection [8]. NOMA encourages more user devices to share the same sub-channel and can provide many data services to increase the utilization rate of resources in a THz network. In order to realize mass wireless connection and increase the resource utilization rate in THz communication, NOMA is applied to the THz network in recent studies. By introducing NOMA to a THz cellular network, a sub-channel and power allocation approach based on an alternating direction method is put forward to optimize energy efficiency.

Inspired by the capacity enhancement of NOMA and the talent coverage improvement of IRS, the combination of NOMA with IRS-assisted communications has aroused significant interests. For example, in some researches, a design of IRS-assisted NOMA downlink transmission was proposed, wherein channel vectors of marginal users are aligned in a preset spatial direction with the aid of IRSs. Some researches put forward an IRS-aided NOMA network, and proposed an energy-efficient scheme to jointly optimize the transmission beamforming of the BS and the reflection phase shift of the IRS. In addition, some researches think out IRS-enhanced millimeter-wave NOMA systems and come up with joint optimization of beam formation and power allocation.

The resource management mechanism of traditional networks has been relatively mature, but when applied to THz networks, it still has many limitations, which mainly include:

Limitation in the number of users and devices accessed to networks: the existing resource management mechanism is only suitable for cases where the number of users accessed to the networks is small; with the increase of users and devices accessed to the networks, the utilization rate of the spectrum will be decreased, so the energy efficiency of the networks needs to be studied in cases of too many users and devices;

Severe signal attenuation: due to severe attenuation of the THz frequency, signals are quite likely to be blocked by a building, users in the shade of the building will be unable to receive signals from a BS, which leads to a failure of normal communication; and a large number of BSs have to be constructed for traditional THz networks to guarantee a minimum signal-to-noise ratio of users;

Low energy efficiency: with the increase of users and devices accessed to networks, too many BSs with high transmitting power have to be constructed and will consume too much energy, which makes the energy utilization rate of existing THz communication systems excessively low;

Low algorithm efficiency: traditional networks use a DQN algorithm and a single agent for reinforcement learning, each agent represents one user, training is performed on the user side without considering information exchange between users, and a large flow will be occupied every time a BS is trained to transmit information.

BRIEF SUMMARY OF THE INVENTION

The technical issue to be settled by the invention is to provide an energy efficiency optimization method for an IRS-assisted NOMA THz network to overcome the defects of the prior art.

The technical solution adopted by the invention to settle the above technical issue is as follows:

An energy efficiency optimization method for an IRS-assisted NOMA THz network comprises the following steps:
Step 1: classifying users into BS users and IRS users;
Step 2: defining a channel model for the BS users and a channel model for the IRS users;
Step 3: calculating a BS user rate and an IRS user rate respectively, and calculating a total rate of a system;
Step 4: proposing an optimization problem for downlink power control and IRS phase shift adjustment; and
Step 5: solving the optimization problem through an MADRL method.

Further, in Step 1, $N_B$ antennas are configured for a base station, $N_U$ antennas are configured for users, and the users are classified into BS users and IRS users; assume the number of the BS users is L, the BS users is represented by a set $\mathcal{L} = \{1, 2, \ldots, L\}$; the IRS users are divided into M clusters, wherein each cluster comprises K users and is served by G IRS elements, and $\mathcal{M} = \{1, 2, \ldots M\}$ $\mathcal{G} = \{1, 2, \ldots G\}$, $\mathcal{K} = \{1, 2, \ldots, K)\}$ a bandwidth of the system is divided into multiple sub-channels, wherein each BS user and each IRS user respectively use one sub-channel, and assume the BS users use the first L sub-channels, IRS users use the remaining sub-channels.

Further, in Step 2, the channel model for the BS users is specifically as follows:

Considering that a THz channel from a BS to users is modeled into a LoS path with the neglect of the reflected, scattered and diffracted fading due to severe attenuation of THz; a channel gain from the BS to a user l at a sub-channel n is expressed as:

$$h_{l,n}^B = \sqrt{\frac{1}{PL(f_n, d_l)}}$$

Wherein, $PL(f_n, d_l)$ is a path loss of the THz LoS path, and $F_n$ and $d_l$ are a THz frequency and a distance between the BS and the user; the path loss of the THz LoS path is formed by two parts, of which one is a free space spreading loss and the other is a molecular absorption loss, with an expression as:

$$PL(f_n, d_l) = L_{spread}(f_n, d_l) \times L_{abs}(f_n, d_l)$$

Where, $L_{spread}(f_n, d_l)$ and $L_{abs}(f_n, d_l)$ meet:

$$L_{spread}(f_n, d_l) = \left(\frac{4\pi f_n d_l}{c}\right)^2$$

$$L_{abs}(f_n, d_l) = -k_{abs}(f_n)d_l$$

Where, c represents a speed of light, and $k_{abs}(f_n)$ represents molecular absorption coefficient;

Assume power transmitted to the user l through the sub-channel n is $P_{l,n}^B$, a received signal is:

$$y_{l,n}^B = h_{l,n}^B p_{l,n}^B + h_{l,n}^B \sum_{l'=1,l' \neq l}^{L} \sum_{n'=n-1,n' \neq n}^{n+1} p_{l',n'}^B + \sigma^2$$

Where, $\sigma^2$ is additive white Gaussian noise power, and $p_{l',n'}^B$ is power transmitted to a user l' through the sub-channel n.

Further, in Step 2, the channel model for the IRS users is specifically as follows:

A channel for the IRS users is composed of a channel from the BS to an IRS, a channel from the IRS to the users, and a phase shift of IRS elements; according to a classical S-V model, assume a channel vector reflected by an IRS i to a $k^{th}$ user in an $m^{th}$ cluster is defined as:

$$H = H^I \Phi H^B$$

Wherein, $H^B$ represents channel attenuation from the BS to the IRS, $H^I$ represents channel attenuation from the IRS to the users; $\Phi$ is a G×G diagonal matrix, represents the phase shift of the IRS elements and meets $\Phi = \text{diag}([e^{j\varphi_1}, \ldots, e^{j\varphi_G}])$, wherein $\varphi_g$ represents the phase shift of a $g^{th}$ element; $H^B$ is expressed as:

$$H^B = A^{I_1} \text{diag}(\alpha) A^{B*}$$

Wherein $$\alpha = \sqrt{N_B G/L_1}[\alpha_1, \ldots, \alpha_{l_1}, \ldots, \alpha_{L_1}]^*$$

$$A^B = [\alpha^B(\phi_1), \ldots, \alpha^B(\phi_{l_1}), \ldots, \alpha^B(\phi_{L_1})]$$

$$A^{I_1} = [\alpha^{I_1}(\gamma_1^A), \ldots, \alpha^{I_1}(\gamma_{l_1}^A), \ldots, \alpha^{I_1}(\gamma_{L_1}^A)]$$

Wherein, $L_1$ represents the number of scattering paths from the BS to the IRS, $\alpha_{l_1}$ is a complex gain from the path loss of a path $l_1$, $\phi_{l_1} \in [0, 2\pi]$ and $\gamma_{l_1}^A \in [0, 2\pi]$ represent a departure angle and an arrival angle on the path $l_1$ from the BS to the IRS; here, uniform linear arrays are considered, and $\alpha^B(\phi_{l_1})$ and $\alpha^{I_1}(\gamma_{l_1}^A)$ represent array response vectors at the BS and the IRS and are expressed as:

$$\alpha^B(\phi_{l_1}) = \frac{1}{\sqrt{N_B}}\left[1, e^{j(2\pi/\lambda)d \sin(\phi_{l_1})}, \ldots, e^{j(N_B-1)(2\pi/\lambda)d \sin(\phi_{l_1})}\right]^*$$

$$\alpha^{I_1}(\gamma_{l_1}^A) = \frac{1}{\sqrt{G}}\left[1, e^{j(2\pi/\lambda)d \sin(\gamma_{l_1}^A)}, \ldots, e^{j(G-1)(2\pi/\lambda)d \sin(\gamma_{l_1}^A)}\right]^*$$

Where, $\lambda$ is a wavelength of THz signals, and d is a distance between adjacent antenna elements or IRS elements;

Similar to a BS-IRS link, a IRS-user channel is formulated as:

$$H^I = A^U \text{diag}(\beta) A^{I_2*}$$

Wherein, $$\beta = N_U G/L_2 [\beta_1, \ldots, \beta_{l_1}, \ldots, \beta_{L_1}]^*$$

$$A^U = [\alpha^U(\psi_1), \ldots, \alpha^U(\psi_{l_2}), \ldots, \alpha^U(\psi_{L_2})]$$

$$A^{I_2} = [\alpha^{I_2}(\gamma_1^D), \ldots, \alpha^{I_2}(\gamma_{l_2}^D), \ldots, \alpha^{I_2}(\gamma_{L_2}^D)]$$

Wherein, $L_2$ represent the number of scattering paths from the BS to the IRS, $\psi_{l_2}$ is a complex gain from the path loss of a path $l_2$, and $\psi_{l_2} \in [0, 2\pi]$ and $\gamma_{l_2}^D \in [0, 2\pi]$ represent a departure angle and an arrival angle on the path $l_2$ from the IRS to the BS; here, uniform linear arrays are considered, and $\alpha^U(\psi_{l_2})$ and $\alpha^{I_2}(\gamma_{l_2}^D)$ are expressed as:

$$\alpha^U(\phi_{l_2}) = \frac{1}{\sqrt{N_U}}\left[1, e^{j(2\pi/\lambda)d \sin(\phi_{l_2})}, \ldots, e^{j(N_U-1)(2\pi/\lambda)d \sin(\phi_{l_2})}\right]^*$$

$$\alpha^{I_1}(\gamma_{l_1}^D) = \frac{1}{\sqrt{G}}\left[1, e^{j(2\pi/\lambda)d \sin(\gamma_{l_2}^D)}, \ldots, e^{j(G-1)(2\pi/\lambda)d \sin(\gamma_{l_2}^D)}\right]^*$$

So, IRS-user channel is:

$$H = A^U \text{diag}(\beta) A^{I_2*} \Phi A^{I_1} \text{diag}(\alpha) A^{B*}$$

For the sake of brevity, assume $N_B = 1$ and $N_U = 1$, the vector H is composed of a vector representing a channel gain $h_{i,m,k,n}^I$ of the $k^{th}$ user in the $m^{th}$ cluster on the sub-channel $p_{i,m,k,n}^I$ represents power transmitted to the $k^{th}$ user in the $m^{th}$ cluster on the sub-channel n; a signal received by the $k^{th}$ user in the $m^{th}$ cluster on the sub-channel n is expressed as:

$$y_{i,m,k,n}^I = h_{i,m,k,n}^I p_{i,m,k,n}^I + h_I^{i,m,k,n} \sum_{n'=n-1,n'\neq n}^{n'=n+1} p_{i,m,k,n}^I + h_{i,m,k,n}^I \sum_{k'=1}^{k'=k-1} p_{i,m,k,n}^I + \sigma^2$$

Further, in Step 3,

The BS user rate is calculated:

Wherein, a signal to noise ratio for signal reception of a BS user l is:

$$SINR_{l,n}^B = \frac{h_{l,n}^B p_{l,n}^B}{h_{l,n}^B \sum_{l'=1, l'\neq l}^{L} \sum_{n'=n-1,n'\neq n}^{n+1} p_{l',n'}^B + \sigma^2}$$

By a Shannon equation, a rate of the user l is expressed as:

$$R_l^B = B \sum_{n=1}^{L} \log_2(1 + SINR_{l,n}^B)$$

Where, B is a bandwidth,

The IRS user rate is calculated:

Wherein, a signal to noise ratio of the $k^{th}$ user in the $m^{th}$ cluster is:

$$SINR_{i,m,k,n}^I = \frac{h_{i,m,k,n}^I p_{i,m,k,n}^I}{h_{i,m,k,n}^I \sum_{n'=n-1,n'\neq n}^{n+1} p_{i,m,k,n}^I + h_{i,m,k,n}^I \sum_{k'=1}^{k'=k-1} p_{i,m,k,n}^I + \sigma^2}$$

The rate is expressed as:

$$R_{i,m,k}^I = B \pi_{n=1}^{L+IMK} \log_2(1+SINR_{i,m,k,n}^I)$$

The total rate of the system is expressed as:

$$R = \Sigma_{l=1}^L R_l^B + \Sigma_{i=1}^I \Sigma_{m=1}^M \Sigma_{k=1}^K R_{i,m,k}^I$$

Further, in Step 4,

To maximize overall energy efficiency of a network, the optimization problem for downlink power control and the IRS phase shift adjustment is proposed, wherein total transmission power of the BS is calculated as the sum power of all the users by:

$$P = \sum_{l=1}^{L}\sum_{n=1}^{L} p_{l,n}^B + \sum_{i=1}^{I}\sum_{m=1}^{M}\sum_{k=1}^{K}\sum_{n=L+1}^{L+IMK} p_{i,m,k,n}^I$$

The energy efficiency of the system network is defined as a ratio of a sum rate to the total power of the network, and the optimization problem is formulated as:

$$\max_{\varphi_{i,m,g}, p_{i,m,k,n}^I, p_{l,n}^B} EE = \frac{R}{P}$$

$C_1$: $0 < p_{i,m,k,n}^I < P_T$, $\forall i \in \mathcal{I}, \forall m \in \mathcal{M}, \forall k \in \mathcal{K}, \forall n \in \mathcal{N}$ $C_2$: $0 < p_{l,n}^B < P_T$, $\forall l \in \mathcal{L}, \forall n \in \mathcal{N}$ $C_3$: $R_{i,m,k}^I \geq R_{min}$, $\forall i \in \mathcal{I}, \forall m \in \mathcal{M}, \forall k \in \mathcal{K}$ -continued $C_4$: $R_l^B \geq R_{min}$, $\forall l \in \mathcal{L}$ $C_5$: $\varphi_{i,m,g} \in [0, 2\pi]$, $\forall i \in \mathcal{I}, \forall m \in \mathcal{M}, \forall g \in \mathcal{G}$ Wherein, $C_1$ and $C_2$ are power limitations of each user, $C_3$ and $C_4$ are minimum rate requirements, and $C_5$ is an angle range.

Further, in Step 5,

The optimization problem is solved through the MADRL method: virtual agents are introduced into the BS as mappings of the users, and the virtual agents perform training to obtain optimal power and phase shift; a central control unit is configured on the BS to collect user information including channel state information (CSI), phase shift and power; a clock is set to ensure synchronous iteration during agent training, so that overall energy efficiency is calculated after each iteration; and the agents perform training according to the collected user information and real-time iteration results to realize global optimization.

Further, a Markov process taking a discrete time, a finite state space and an action space into account is used for training; basic elements of reinforcement learning are represented by a tuple ($\mathcal{S}$, $\mathcal{A}$, $\mathcal{R}$, $\mathcal{P}$) where $\mathcal{S}$ represents a state space, $\mathcal{A}$ represents an action space, $\mathcal{R}$ represents a reward function, and $\mathcal{P}$ represents a state transition probability; and the state space and the action space are set as follows:

(1) State space: a tuple ($\varphi$, p) is defined to represent an angle of the IRS elements and the power of the BS users and the IRS users, and the state space is expressed by a formula $\mathcal{S} = \{s | s = (\varphi, p)\}$, wherein $\varphi = \{\varphi_1, \ldots, \varphi_j, \ldots \varphi_G\}$;

(2) Action space: in order to obtain a finite space, the angle and the power are discretized by;

$$\varphi_j: \left\{0, \left\{\varphi_{min}\left(\frac{\varphi_{max}}{\varphi_{min}}\right)^{\frac{i}{|\varphi|-2}} \mid i = 0, \ldots, |\varphi|-2\right\}\right\}$$

$$\varphi: \left\{0, \left\{P_{min}\left(\frac{P_{max}}{P_{min}}\right)^{\frac{i}{|P|-2}} \mid i = 0, \ldots, |P|-2\right\}\right\}$$

Wherein, $\varphi_{min}$ and $\varphi_{max}$ are a minimum phase and a maximum phase of the IRS elements, $P_{min}$ and $P_{max}$ are minimum user power and maximum user power, and a discrete quantity of the angle and a discrete quantity of the power are $|\varphi|$ and $|P|$ respectively; the action space is formed as $\mathcal{A} = \{a | a = (\varphi, p)\}$.

(3) Reward space: a difference between the overall energy efficiency in a current state and the overall energy efficiency in a previous state is defined as a reward, which is presented as:

$\mathcal{R} = EE_{t+1} - EE_t$, wherein $EE_{t+1}$ and $EE_t$ are energy efficiency in a state $s_{t+1}$ and energy efficiency in a state $s_t$ respectively;

An optimal strategy $\pi$ is obtained by the agents to realize a maximum cumulative reward, which is obtained by:

$$R_t \triangleq \sum_{t=0}^{\infty} \gamma^t r_{t+1}$$

Where, $\gamma \in (0,1]$ is a discount factor for future rewards;

During training, the agents select an action according to the optimal strategy $\pi$; at the state $s_t$, the agents take an action $\alpha_t$ according to the optimal strategy $\pi$, and at this moment, an action-value function $Q_\pi(s_t, a_t)$ at of the agents is expressed as:

$$Q\pi(s_t,a_t) \triangleq E_\pi[R_t|s=s_t, a=a_t]$$

According to a Bellman equation, $$Q^*(s, a) \triangleq E\left[r_t + \gamma \max_{a'} Q^*(s', a') \mid s = s_t, a = a_t\right]$$

An evaluation of the optimal strategy is expressed as:

$$Q^*(s, a) \triangleq \max_{\pi \in \Pi} Q^\pi(s, a)$$

The optimal strategy is obtained by:

$$\pi^* = \arg\max_{a \in A} Q^*(s, a)$$

To search an optimal strategy in a large state space and a large action space, a DQN is introduced into MADRL; the optimal strategy and the value function are approximated as function according to $Q_t(s, \alpha; \theta) \approx Q^*(s, \alpha)$, where $\theta$ is a weight and is updated by training; the DQN comprises a target network and a current network, which are trained by minimizing a loss function to optimize the parameter $\theta$; the loss function is:

$$loss(\theta) = (y_t^{DQN} - Q_t(s_t, \alpha_t; \theta))^2$$

Wherein, $Q_t(s_t, \alpha_t; \theta)$ is an output of the neural network with the parameter is $\theta$ at the state $s_t$, and $y_t^{DQN}$ is an output of the target network with the parameter is $\hat{\theta}$ at the state $s_{t+1}$;

$$y_t^{DQN} = r_t + \gamma \max_{a_{t+1} \in A} Q(s_{t+1}, a_{t+1}; \hat{\theta})$$

The loss function is minimized through a gradient descent algorithm, and the action-value function is approximated by the neural network until convergence.

Further, an action-value function Q is, a target action-value function $\hat{\theta} = \theta$, an index T for iteration and an experience pool $\mathcal{D}$ are generated according to the random parameter $\theta$;

For episode=1 to M do
(1) Initializing the state $s_t$
(2) For t=1 to T
a. Selecting an action by the agents according to $$= \arg\max_{a \in A} Q^*(s_t, a_t; \theta);$$

b. Performing the action at by the agents to switch from the current state $s_t$ to the next state $s_{t+1}$;
c. Obtaining the reward $r_t$ through data exchange between the agents and the central control unit;
d. Forming a tuple $(s_t, a_t, r_t, s_{t+1})$ by $s_t, a_t, r_t, s_{t+1}$, and saving the tuple $(s_t, a_t, r_t, s_{t+1})$ the experience pool $\mathcal{D}$;
e. Randomly selecting a mini-batch tuple $(s_t, a_t, r_t, s_{t+1})$ from the experience pool $\mathcal{D}$;
f. Calculating $y_t^{DQN}$ according to $$y_t^{DQN} = r_t + \gamma \max_{a_{t-1} \in A} Q(s_{t+1}, a_{t+1}; \hat{\theta});$$

g. Updating the parameter $\theta$ in $loss(\theta) = (y_t^{DQN} - Q_t(s_t, \alpha_t; \theta))^2$ through a gradient descent method;
h. Assigning $\theta$ to $\hat{\theta}$ update $\theta$ every a period of time, that is $\hat{\theta} = \theta$;
i. Calculating energy efficiency $EE_t$ by the central control unit;
j. Calculating the reward according to $r_t = EE_{t+1} - EE_t$.
Ending the cycle.

Compared with the prior art, the invention has the following advantages and effects:
1. An IRS-aided THz cellular network is constructed through NOMA. When the BS user rate and the IRS user rate are calculated, both adjacent band interference of the users and in-band interference of each group of IRS users are taken into consideration.
2. To maximum the energy efficiency of the system, an optimization problem is proposed to adjust the phase angle of IRS elements and control downlink power under the constraints of maximum transmission power and minimum date rate.
3. The optimization problem is solved through the MADRL method. Virtual agents are introduced into the BS and perform training synchronously through the central control and periodical exchange information. The DQN is sued to perform non-uniform discretization on optimization variables to construct an action space.

DETAILED DESCRIPTION OF THE INVENTION

Figure 1:
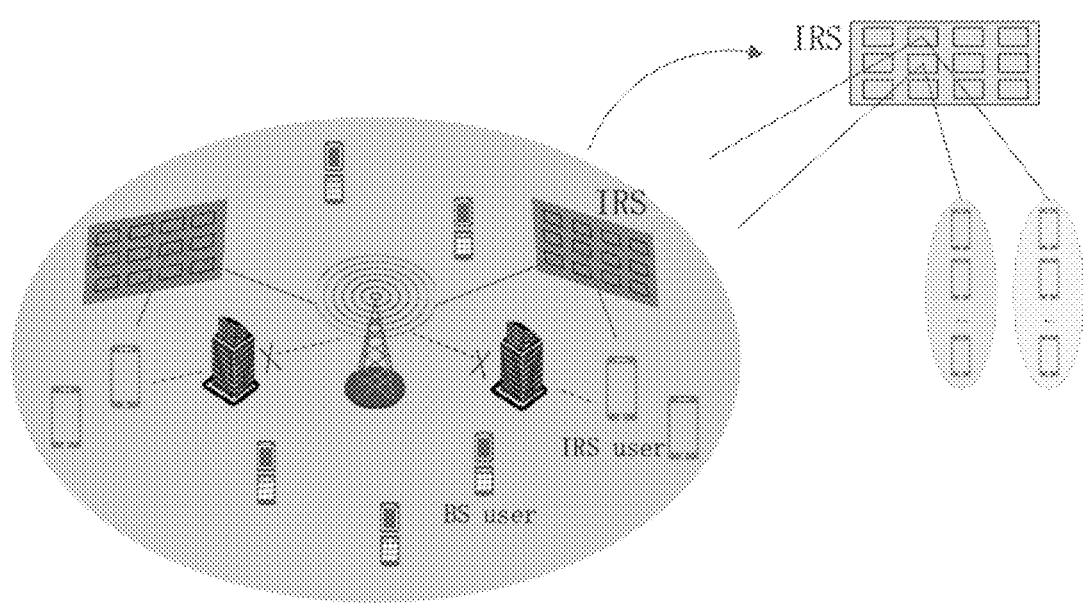
FIG. 1 is a model diagram of an IRS-aided NOMA THz network system according to the invention.
Figure 2:
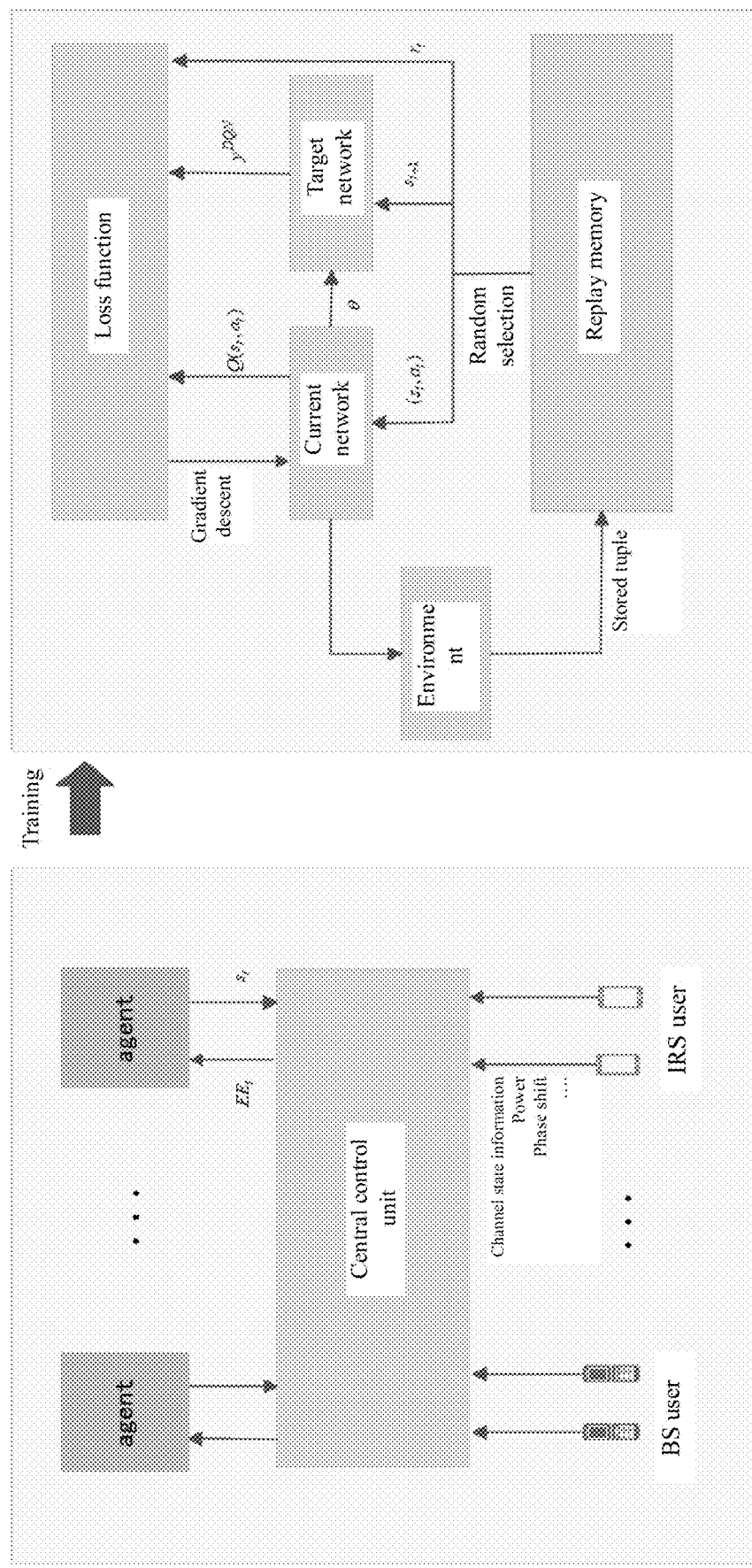
FIG. 2 is a schematic diagram of the interaction between agents and the environment according to one embodiment of the invention.

To expound in detail the technical solutions adopted by the invention to fulfill desired technical purposes, the technical solutions of the embodiments of the invention will be clearly and completely described below in conjunction with the drawings of the embodiments of the invention. Obviously, the embodiments in the following description are merely illustrative ones, and are not all possible ones of the invention, and the technical means or technical features in the embodiments of the invention can be substituted without creative labor. The invention will be described in detail below with reference to the accompanying drawings and embodiments.

First of all, part of specialized vocabularies used in the invention will be explain:
1. IRS-aided THz communication: many researches focus on IRS-aided communication in the THz band. Literature [1] puts forward a method for searching for an optimal phase shift of IRS elements to improve the system rate in the THz band. In Literature [2], discrete phase shifts of IRSs and pre-coders are designed at a base station (BS) to optimize spectral efficiency. In Literature [3], a space tracking approach is developed for channel estimation of IRS-assisted THz networks, so as to maximum the rate of a system.

Application of NOMA to THz communication: in order to realize mass wireless connection and increase the resource utilization rate in THz communication, NOMA s applied to THz networks in recent study. In Literature [5], NOMA is applied to THz cellular networks, and a sub-channel and power allocation scheme based on an alternating direction method is proposed to optimize energy efficiency. In addition, in Literature [4], a long-term use-center window property of THz is captured, and a central sub-band and side sub-bands of a THz window are allocated to long and short NOMA groups respectively. In NOMA, power allocated to users is related to the channel gain. Small channel gains will be allocated to high-power users, and large channel gains will be allocated to low-power users [4]. NOMA can decode or demodulate superposed signals under coverage.

IRS-aided NOMA network: Under the enlightenment of capacity enhancement of NOMA and coverage increase of IRSs, IRS-aided NOMA communication has aroused the interest of researchers. Literature [6] proposes a design of IRS-aided NOMA downlink transmission, wherein channel vectors of marginal users are aligned in a preset spatial direction with the aid of IRSs. In Literature [7], the author emphatically studies an IRS-aided NOMA network and puts forward an energy-saving scheme based on joint optimization of emitted wave beam formation of a base station (BS) and reflecting phase shift of IRSs. In addition, Literature [8] proposes IRS-enhanced millimeter-wave NOMA systems and comes up with joint optimization of beam formation and power allocation. In Literature [5], the author focuses on an IRS-aided NOMA network and puts forward an energy-saving algorithm, which maximizes the energy efficiency of a system by joint optimization of the transmitted beam formation of a BS and reflecting phase shift of IRSs. Literature [6] studies an IRS-enhanced millimeter wave NOMA system and puts forward joint optimization of active beam formation, passive beam formation and power distribution. In Literature [7], the validity of IRSs in transmission power of NOMA systems is studied, and considering the constraints of minimum signal-to-interference ratio of each user, the problem of power minimization of an IRS-aided downlink NOMA system is proposed. In Literature [8], a simple design of IRS-assisted NOMA downlink transmission is put forward. The base station generates orthogonal wave beams in the spatial direction of a channel near to users by means of traditional space division multiple access; and with the aid of IRSs, valid channel vectors of marginal users are aligned in a preset spatial direction to ensure that these wave beams can serve extra marginal users.

Introduction of reinforcement learning: Literature [9]-[11] solve an optimization problem by means of reinforcement learning. Literature [9] studies a method for power allocation in multi-cell networks, which, different from traditional optimization methods, uses deep reinforcement learning (DRL) for power allocation. The objective of this article is to maximize the overall capacity of a whole network under the condition of random and dense distribution of base stations. A wireless resource mapping method and a deep neural network Deep Q-fully-connected network (DQFCNet) are provided. Compared with power allocation based on water-filling and the Q learning method, the DQFCNet can realize a higher overall capacity. Simulation results indicate that the convergence rate and stability of the DQFCNet are remarkably improved. Literature [9] solves the problem of dynamic spectrum access by means of DRL. Specifically, in this article, a scene where different types of nodes share multiple discrete channels is studied, these nodes do not have the capacity to communicate with other nodes and have no prior knowledge about the behaviors of other nodes. The objective of each node is to maximize the long-term transmission succeed rate of its own. This problem is expressed as a Markov decision process (MDP) with unknown system dynamics. To overcome the challenge of an unknown environment and a large transition matrix, two specific DRL methods are used: deep Q network (DQN) and double deep Q network (DDQN). In addition, improved DQN techniques, including qualification tracking, prior experience and "prediction process", are introduced. Simulation results indicate that the DQN and the DDQN can effectively learn communication modes of different nodes without prior knowledge and fulfill approximately the optimal performance. Literature [11] points out that complete system observability is necessary for optimizing radio transmission power and user data rate in wireless systems. Although this issue has been widely studied in this literature, there is still no practical solution for approaching the optimal performance merely by means of the observability of available parts of an actual system. The invention provides a reinforcement learning method for realizing downlink power control and rate adaptation in a cellular network to overcome this defect. The invention puts forward the design of a comprehensive learning framework, including a system state, a common reward function and an effective learning algorithm. System-level simulation results show that this design learns a power control strategy rapidly, fulfills a remarkable energy-saving effect and guarantees the fairness of users in a system.

As shown in FIG. 1, the invention provides an energy efficiency optimization method for an IRS-assisted NOMA THz network, comprising the following steps:

Step 1: users are classified into BS users and IRS users.

$N_B$ antennas are configured for a base station, $N_U$ antennas are configured for users, and the users are classified into BS users and IRS users; assume the number of the BS users is L, the BS users are represented by a set $\mathcal{L}=\{1, 2, \ldots, L\}$; the IRS users are divided into M clusters, wherein each cluster comprises K users and is served by G IRS elements, and $\mathcal{M}=\{1, 2, \ldots, M\}$ $\mathcal{G}=\{1, 2, \ldots G\}$, $\mathcal{K}=\{1, 2, \ldots, K\}$; a bandwidth of the system is divided into multiple sub-channels, wherein each BS user and each IRS user respectively use one sub-channel, and assume the BS users use the first L sub-channels, IRS users use the remaining sub-channels.

Step 2: a channel model for the BS users and a channel model for the IRS users are defined.

The channel model for the BS users is specifically as follows:

Considering that a THz channel from a BS to users is modeled into a LoS path with the neglect of the reflected, scattered and diffracted fading due to severe attenuation of THz; a channel gain from the BS to a user l at a sub-channel n is expressed as:

$$h_{l,n}^B = \sqrt{\frac{1}{PL(f_n, d_l)}}$$

Wherein, $PL(f_n, d_l)$ is a path loss of the THz LoS path, and $f_n$ and $d_l$ are a THz frequency and a distance between the BS and the user; the path loss of the THz LoS path is formed by two parts, of which one is a free space spreading loss and the other is a molecular absorption loss, with an expression as:

$$PL(f_n, d_l) = L_{spread}(f_n, d_l) \times L_{abs}(f_n, d_l)$$

Where, $L_{spread}(f_n, d_l)$ and $L_{abs}(f_n, d_l)$ meet $$L_{spread}(f_n, d_l) = \left(\frac{4\pi f_n d_l}{c}\right)^2$$

$$L_{abs}(f_n, d_l) = e^{-k_{abs}(f_n)d_l}$$

Where, c represents a speed of light, and $k_{abs}(f_n)$ represents molecular absorption coefficient;

Assume power transmitted to the user 1 through the sub-channel n is $P_{l,n}^B$, a received signal is:

$$y_{l,n}^B = h_{l,n}^B p_{l,n}^B + h_{l,n}^B \sum_{l'=1, l' \neq l}^{L} \sum_{n'=n-1, n' \neq n}^{n+1} p_{l',n'}^B + \sigma^2$$

Where, $\sigma^2$ is additive white Gaussian noise power, and $p_{l',n'}^B$ is power transmitted to a user l' through the sub-channel n.

The channel model for the IRS users is specifically as follows:

A channel for the IRS users is composed of a channel from the BS to an IRS, a channel from the IRS to the users, and a phase shift of IRS elements; according to a classical S-V model, assume a channel vector reflected by an IRS i to a $k^{th}$ user in an $m^{th}$ cluster is defined as:

$$H = H^I \Phi H^B$$

Where, $H^B$ represents channel attenuation from the BS to the IRS, $H^I$ represents channel attenuation from the IRS to the users; $\Phi$ is a G×G diagonal matrix, represents the phase shift of the IRS elements and meets $\Phi = \text{diag}([e^{j\varphi_1}, \ldots, e^{j\varphi_G}])$, wherein $\varphi_g$ represents the phase shift of a $g^{th}$ element; $H^B$ is expressed as:

$$H^B = A^{I1} \text{diag}(\alpha) A^{B*}$$

Wherein $$\alpha = \sqrt{N_B G/L_1}[\alpha_1, \ldots, \alpha_{l_1}, \ldots, \alpha_{L_1}]^*$$

$$A^B = [\alpha^B(\phi_1), \ldots, \alpha^B(\phi_{l_1}), \ldots, \alpha^B(\phi_{L_1})]$$

$$A^{I1} = [\alpha^{I1}(\gamma_1^A), \ldots, \alpha^{I1}(\gamma_{l_1}^A), \ldots, \alpha^{I1}(\gamma_{L_1}^A)]$$

Where, $L_1$ represents the number of scattering paths from the BS to the IRS, $\alpha_{l_1}$ is a complex gain from the path loss of a path $l_1$, $\phi_{l_1} \in [0, 2\pi]$ and $\gamma_{l_1}^A \in [0, 2\pi]$ represent a departure angle and an arrival angle on the path $l_1$ from the BS to the IRS; here, considering uniform linear array are considered, and $\alpha^B(\phi_{l_1})$ and $\alpha^{I1}(\gamma_{l_1}^A)$ represent array response vectors at the BS and the IRS and are expressed $$\alpha^B(\phi_{l_1}) = \frac{1}{\sqrt{N_B}}\left[1, e^{j(2\pi/\lambda)d \sin(\phi_{l_1})}, \ldots, e^{j(N_B-1)(2\pi/\lambda)d \sin(\phi_{l_1})}\right]^*$$

$$\alpha^{I1}(\gamma_{l_1}^A) = \frac{1}{\sqrt{G}}\left[1, e^{j(2\pi/\lambda)d \sin(\gamma_{l_1}^A)}, \ldots, e^{j(N_B-1)(2\pi/\lambda)d \sin(\gamma_{l_1}^A)}\right]^*$$

Where, $\lambda$ is a wavelength of THz signals, and d is a distance between adjacent antenna elements or IRS elements;

Similar to a BS-IRS link, a IRS-user channel is formulated as:

$$H^I = A^U \text{diag}(\beta) A^{I2*}$$

Wherein, $$\beta = \sqrt{N_U G/L_2}[\beta_1, \ldots, \beta_{l_2}, \ldots, \beta_{L_2}]^*$$

$$A^U = [\alpha^U(\psi_1), \ldots, \alpha^U(\psi_{l_2}), \ldots, \alpha^U(\psi_{L_2})]$$

$$A^{I2} = [\alpha^{I2}(\gamma_1^D), \ldots, \alpha^{I2}(\gamma_{l_2}^D), \ldots, \alpha^{I2}(\gamma_{L_2}^D)]$$

Where, $L_2$ represent the number of scattering paths from the BS to the IRS, $\psi_{l_2}$ is a complex gain from the path loss of a path $l_2$, and $\psi_{l_2} \in [0, 2\pi]$ and $\gamma_{l_2}^D \in [0, 2\pi]$ represent a departure angle and an arrival angle on the path $l_2$ from the IRS to the BS; here, uniform linear arrays are considered, and a $\alpha^U(\psi_{l_2})$ and $\alpha^{I2}(\gamma_{l_2}^D)$ are expressed as:

$$\alpha^U(\phi_{l_2}) = \frac{1}{\sqrt{N_U}}\left[1, e^{j(2\pi/\lambda)d \sin(\phi_{l_2})}, \ldots, e^{j(N_U-1)(2\pi/\lambda)d \sin(\phi_{l_2})}\right]^*$$

$$\alpha^{I2}(\gamma_{l_2}^D) = \frac{1}{\sqrt{G}}\left[1, e^{j(2\pi/\lambda)d \sin(\gamma_{l_2}^D)}, \ldots, e^{j(G-1)(2\pi/\lambda)d \sin(\gamma_{l_2}^D)}\right]^*$$

So, IRS-user channel is:

$$H = A^U_{\text{diag}}(\beta) A^{I2*} \Phi A^{I1} \text{diag}(\alpha) A^{B*}$$

For the sake of brevity, assume $N_B = 1$ and $N_U = 1$, the vector H is composed of a vector representing a channel gain $h_{i,m,k,n}^I$ of the $k^{th}$ user in the $m^{th}$ cluster on the sub-channel n; $P_{i,m,k,n}^I$ represents power transmitted to the $k^t n$ user in the $m^{th}$ cluster on the sub-channel n; a signal received by the $k^{th}$ user in the $m^{th}$ cluster on the sub-channel n is expressed as:

$$y_{i,m,k,n}^I = h_{i,m,k,n}^I p_{i,m,k,n}^I + h_{i,m,k,n}^I \sum_{n'=n-1, n' \neq n}^{n'=n+1} p_{i,m,k,n}^I + h_{i,m,k,n}^I \sum_{k'=1}^{k'=k-1} p_{i,m,k,n}^I + \sigma^2$$

Step 3: a BS user rate and an IRS user rate are calculated respectively, and a total rate of a system is calculated.

The BS user rate is calculated:

Wherein, a signal to noise ratio for signal reception of a BS user l is:

$$SINR_{l,n}^B = \frac{h_{l,n}^B p_{l,n}^B}{h_{l,n}^B \sum_{l'=1, l' \neq l}^{L} \sum_{n'=n-1, n' \neq n}^{n+1} p_{l',n'}^B + \sigma^2}$$

By a Shannon equation, a rate of the user l is expressed as:

$$R_l^B = B \sum_{n=1}^{L} \log_2(1 + SINR_{l,n}^B)$$

Where, B is a bandwidth;

The IRS user rate is calculated:

Wherein, a signal to noise ratio of the $k^{th}$ user in the $m^{th}$ cluster is:

$$SINR_{i,m,k,n}^I = \frac{h_{i,m,k,n}^I p_{i,m,k,n}^I}{h_{i,m,k,n}^I \sum_{n'=n-1, n' \neq n}^{n'=n+1} p_{i,m,k,n}^I + h_{i,m,k,n}^I \sum_{k'=1}^{k'=k-1} p_{i,m,k,n}^I + \sigma^2}$$

The rate is expressed as:

$R_{i,m,k}^I = B\Sigma_{n=1}^{L+IMK} \log_2(1+\text{SINR}_{i,m,k,n}^I)$

The total rate of the system is expressed as:

$R = \Sigma_{l=1}^L R_l^B + \Sigma_{i=1}^I \Sigma_{m=1}^M \Sigma_{k=1}^K R_{i,m,k}^I$ Step 4: an optimization problem for downlink power control and IRS phase shift adjustment is proposed.

To maximize overall energy efficiency of a network, the optimization problem for downlink power control and IRS phase shift adjustment is proposed, wherein total transmission power of the BS is calculated as the sum power of all the users by: The optimization problem of downlink power control and IRS phase shift modulation is proposed to maximize overall energy efficiency of a network, wherein total transmission power of the BS is a sum of power of all the users and is expressed as:

$$P = \sum_{l=1}^L \sum_{n=1}^L p_{l,n}^B + \sum_{i=1}^I \sum_{m=1}^I \sum_{k=11}^K \sum_{n=L+1}^{L+IMK} p_{i,m,k,n}^I$$

The energy efficiency of the system network is defined as a ratio of a sum rate to the total power of the network, and the optimization problem is formulated as:

$$\max_{\varphi_{i,m,g}, p_{i,m,k,n}^I, p_{l,n}^B} EE = \frac{R}{P}$$

$C_1: 0 < p_{i,m,k,n}^I < P_T, \forall i \in \mathcal{I}, \forall m \in \mathcal{M}, \forall k \in \mathcal{K}, \forall n \in \mathcal{N}$ $C_2: 0 < p_{l,n}^B < P_T, \forall l \in \mathcal{L}, \forall n \in N$ $C_3: R_{i,m,k}^I \geq R_{min}, \forall i \in \mathcal{I}, \forall m \in M, \forall k \in \mathcal{K}$ $C_4: R_l^B \geq R_{min}, \forall l \in \mathcal{L}$ $C_5: \varphi_{i,m,g} \in [0, 2\pi], \forall i \in \mathcal{I}, \forall m \in \mathcal{M}, \forall g \in \mathcal{G}$ Where, $C_1$ and $C_2$ are power limitations of each user, $C_3$ and $C_4$ are minimum rate requirements, and $C_5$ is an angle range.

Step 5: the optimization problem is solved through an MADRL method.

The optimization problem is solved through the MADRL method: virtual agents are introduced into the BS as mappings of the users and perform training to obtain optimal power and phase shift; a central control unit is configured on the BS to collect user information including channel state information (CSI), phase shift and power; setting a clock to ensure synchronous iteration during agent training, so that overall energy efficiency is calculated after each iteration; and the agents perform training according to the collected user information and real-time iteration results to realize global optimization.

A Markov process taking a discrete time, a finite state space and an action space into account is used for training; basic elements of reinforcement learning are represented by a tuple ($\mathcal{S}$, $\mathcal{A}$, $\mathcal{R}$, $\mathcal{P}$), where $\mathcal{S}$ represents a state space, $\mathcal{A}$ represents an action space, $\mathcal{R}$ represents a reward function, and $\mathcal{P}$ represents a state transition probability; and the state space and the action space are set as follows:

1) State space: a tuple $(\varphi, p)$ is defined to represent an angle of the IRS elements and the power of the BS users and the IRS users, and the state space is expressed by a formula as $\mathcal{S} = \{s|s=(\varphi, p)\}$, wherein $\varphi=\{\varphi_1, \ldots, \varphi_j, \ldots, \varphi_G\}$;

2) Action space: in order to obtain a finite space, the angle and the power are discretized by;

$$\varphi_j: \left\{0, \left\{\varphi_{min}\left(\frac{\varphi_{max}}{\varphi_{min}}\right)^{\frac{i}{|\varphi|-2}} \mid i = 0, \ldots, |\varphi|-2\right\}\right\}$$

$$\varphi: \left\{0, \left\{P_{min}\left(\frac{P_{max}}{P_{min}}\right)^{\frac{i}{|P|-2}} \mid i = 0, \ldots, |P|-2\right\}\right\}$$

Wherein, $\varphi_{min}$ and $\varphi_{max}$ are a minimum phase and a maximum phase of the IRS elements, $P_{min}$ and $P_{max}$ are minimum user power and maximum user power, and a discrete quantity of the angle and a discrete quantity of the power are $|\varphi|$ and $|P|$ respectively; the action space is formed as $\mathcal{A} = \{a|a=(\varphi, p)\}$;

3) Reward space: a difference between the overall energy efficiency in a current state and the overall energy efficiency in a previous state is defined as a reward, which is presented as:

$\mathcal{R} = EE_{t+1} - EE_t$, wherein $EE_{t+1}$ and $EE_t$ are energy efficiency in a state $s_{t+1}$ and energy efficiency in a state $s_t$ respectively;

An optimal strategy $\pi$ is obtained by the agents to realize a maximum cumulative reward, which is obtained by:

$$R_t \triangleq \sum_{t=0}^{\infty} \gamma^t r_{t+1}$$

Where, $\gamma \in (0,1]$ is a discount factor for future rewards;

During training, the agents select an action according to the optimal strategy $\pi$; at the state $s_t$, the agents take an action $\alpha_t$ according to the optimal strategy $\pi$, and at this moment, an action-value function $Q_\pi(s_t, \alpha_t)$ of the agents is expressed as:

$Q_\pi(s_t, \alpha_t) \triangleq E_\pi[R_t|s=s_t, \alpha=\alpha_t]$

According to a Bellman equation, $$Q^*(s, a) \triangleq E\left[r_t + \gamma \max_{a'} Q^*(s', a') \mid s = s_t, a = a_t\right]$$

An evaluation of the optimal strategy is expressed as:

$$Q^*(s, a) \triangleq \max_{a \in \mathcal{A}} Q^\pi(s, a)$$

The optimal strategy is obtained by:

$$\pi^* = \arg\max_{a \in \mathcal{A}} Q^*(s, a)$$

To search an optimal strategy in a large state space and a large action space, a DQN is introduced into MADRL; the optimal strategy and the value function are approximated as a function according to $Q_i(s, \alpha; \theta) \neq Q^*(s, \alpha)$, where $\theta$ is a weight and is updated by training; the DQN comprises a target network and a current network, which are trained by minimizing a loss function to optimize the parameter $\theta$; the loss function is:

$\text{loss}(\theta) = (y_t^{DQN} - Q_i(s_t, \alpha_t; \theta))^2$

Wherein, $Q_t(s_t, \alpha_t; \theta)$ is an output of the neural network with the parameter is $\theta$ at the state $s_t$, and $y_t^{DQN}$ is an output of the target network with the parameter is $\hat{\theta}$ at the state $s_{t+1}$;

$$y_t^{DQN} = r_t + \gamma \max_{a_{t+1} \in \mathcal{A}} Q(s_{t+1}, a_{t+1}; \hat{\theta})$$

The loss function is minimized through a gradient descent algorithm, and the action-value function is approximated by the neural network until convergence.

An action-value function Q is, a target action-value function $\hat{\theta}=\theta$, an index T for iteration and an experience pool $\mathcal{D}$ are generated according to the random parameter $\theta$;

For episode=1 to M
1) Initializing the state $s_t$
2) For t=1 to T
a. Selecting an action by the agents according to $$= \arg\max_{a_t \in \mathcal{A}} Q^*(s_t, a_t; \theta);$$

b. Performing the action t by the agents to switch from the current state $s_t$ to the next state $s_{t+1}$;
c. Obtaining the reward $r_t$ through data exchange between the agents and the central control unit;
d. Forming a tuple $(s_t, \alpha_t, r_t, s_{t+1})$ by $s_t, \alpha_t, r_t, s_{t+1}$, and saving the tuple $(s_t, \alpha_t, r_t, s_{t+1})$ the experience pool $\mathcal{D}$;
e. Randomly selecting a mini-batch tuple $(s_t, \alpha_t, r_t, s_{t+1})$ from the experience pool $\mathcal{D}$;
f. Calculating $y_t^{DQN}$ according to $$y_t^{DQN} = r_t + \gamma \max_{a_{t+1} \in \mathcal{A}} Q(s_{t+1}, a_{t+1}; \hat{\theta});$$

g. Updating the parameter $\theta$ in $\text{loss}(\theta)=(y_t^{DQN}-Q_t(s_t, \alpha_t; \theta))^2$ through a gradient descent method;
h. Assigning $\theta$ to $\hat{\theta}$ to update $\theta$ every a period of time, that is $\hat{\theta}=\theta$;
i. Calculating energy efficiency $EE_t$ by the central control unit;
j. Calculating the reward according to $r_t=EE_{t+1}-EE_t$;
Ending the cycle.

The above embodiments are merely preferred ones of the invention, and are not intended to limit the invention in any form. Although the invention has been disclosed above with reference to the preferred embodiments, these embodiments are not used to limit the invention. Any skilled in the art can obtain equivalent embodiments by slightly changing or modifying the technical contents disclosed above without departing from the scope of the technical solutions of the invention. Any simple amendments, equivalent substitutions and improvements made to the above embodiments based on the spirit and principle of the invention according to the technical essence of the invention should still fall within the protection scope of the technical solutions of the invention.

LITERATURE LIST IN THIS APPLICATION

[1] W. Chen, X. Ma, Z. Li, and N. Kuang, "Sum-rate maximization for intelligent reflecting surface based terahertz communication systems," IEEE Int. Conf. Commun., pp. 153-157, August 2019.
[2] W. Chen, Z. Chen, X. Ma, Y. Chi, and Z. Li, "Spectral efficiency optimization for intelligent reflecting surface aided multi-input multioutput terahertz system," Microwave and Optical Technology Lett., vol. 62, no. 8, pp. 2754-2759, August 2020.
[3] X. Ma, Z. Chen, W. Chen, Z. Li, Y. Chi, C. Han, and S. Li, "Joint channel estimation and data rate maximization for intelligent reflecting surface assisted terahertz MIMO communication systems," IEEE Access, vol. 8, pp. 99565-99581, August 2020.
[4] X. Zhang, C. Han, and X. Wang, "Joint beamforming-power-bandwidth allocation in terahertz NOMA networks," Int. Conf. on Sensing, Commun., and Netw., pp. 1-9, June 2019.
[5] H. Zhang, Y. Duan, K. Long, and V. C. M. Leung, "Energy efficient resource allocation in terahertz downlink NOMA systems," IEEE Trans. Commun., vol. 69, no. 2, pp. 1375-1384, February 2021.
[6] Z. Ding and H. V. Poor, "A simple design of IRS-NOMA transmission," I EEE Commun. Lett., vol. 24, no. 5, pp. 1119-1123, May 2020.
[7] F. Fang, Y. Xu, Q. Pham, and Z. Ding, "Energy-efficient design of IRS-NOMA networks," IEEE Trans. Veh. Technol., vol. 69, no. 11, pp. 14088-14092, November 2020.
[8] J. Zuo, Y. Liu, E. Basar, and O. A. Dobre, "Intelligent reflecting surface enhanced millimeter-wave NOMA systems," IEEE Commun. Lett., vol. 24, no. 11, pp. 2632-2636, November 2020.
[9] Y. Zhang, C. Kang, T. Ma, Y. Teng, and D. Guo, "Power allocation in multi-cell networks using deep reinforcement learning," IEEE Veh. Technol. Conf., pp. 1-6, August 2018.
[10] Y. Xu, J. Yu, W. C. Headley, and R. M. Buehrer, "Deep reinforcement learning for dynamic spectrum access in wireless networks," IEEE Military Commun. Conf., pp. 207-212, October 2018.
[11] E. Ghadimi, F. D. Calabrese, G. Peters, and P. Soldati, "A reinforcement learning approach to power control and rate adaptation in cellular networks," IEEE Int. Conf. Commun., pp. 1-7, May 2017.

What is claimed is:

1. An energy efficiency optimization method for an IRS-assisted NOMA THz network, comprising the following steps:
Step 1: classifying users into BS users and IRS users;
Step 2: defining a channel model for the BS users and a channel model for the IRS users;
Step 3: calculating a BS user rate and an IRS user rate respectively, and calculating a total rate of a system;
Step 4: proposing an optimization problem for downlink power control and IRS phase shift adjustment; and
Step 5: solving the optimization problem through an MADRL method.

2. The energy efficiency optimization method for an IRS-assisted NOMA THz network according to claim 1, wherein in Step 1, $N_B$ antennas are configured for a base station, $N_U$ antennas are configured for users and the users are classified into BS users and IRS users; assume the number of the BS users is L, the BS users is represented by a set $\mathcal{L}=\{1, 2 \ldots, L\}$; the IRS users are divided into M clusters, wherein each cluster comprises K users and is served by G IRS elements, and $\mathcal{M}=\{1, 2, \ldots M\}$ $\mathcal{G}=\{1, 2, \ldots G\}$, $\mathcal{K}\{1, 2, \ldots K\}$; a bandwidth of the system is divided into multiple sub-channels, wherein each BS user and each IRS user respectively use one sub-channel, and assume the BS users use the first L sub-channels, IRS users use the remaining sub-channels.

3. The energy efficiency optimization method for an IRS-assisted NOMA THz network according to claim 1, wherein in Step 2, the channel model for the BS users is specifically as follows:

considering that a THz channel from a BS to users is modeled into a LoS path with the neglect of the reflected, scattered and diffracted fading due to severe attenuation of THz; a channel gain from the BS to a user l at a sub-channel n is expressed as:

$$h_{l,n}^B = \sqrt{\frac{1}{PL(f_n, d_l)}}$$

wherein, $PL(f_n, d_l)$ is a path loss of the THz LoS path, and $f_n$ and $d_l$ are a THz frequency and a distance between the BS and the user; the path loss of the THz LoS path is formed by two parts, of which one is a free space spreading loss and the other is a molecular absorption loss, with an expression as:

$$PL(f_n,d_l)=L_{spread}(f_n,d_l) \times L_{abs}(f_n,d_l)$$

where, $L_{spread}(f_n, d_l)$ and $L_{abs}(f_n, d_l)$ meet:

$$L_{spread}(f_n, d_l) = \left(\frac{4\pi f_n d_l}{c}\right)^2$$

$$L_{abs}(f_n, d_l) = e^{-k_{abs}(f_n)d_l}$$

where, c represents a speed of light, and $k_{abs}(f_n)$ represents molecular absorption coefficient;

assume power transmitted to the user i through the sub-channel n is $p_{l,n}^B$, a received signal is:

$$y_{l,n}^B = h_{l,n}^B p_{l,n}^B + h_{l,n}^B \sum_{l'=1, l' \ne l}^{L} \sum_{n'=n-1, n' \ne n}^{n+1} p_{l',n'}^B + \sigma^2$$

where, $\sigma^2$ is additive white Gaussian noise power, and $p_{l',n'}^B$ is power transmitted to a user l' through the sub-channel n.

4. The energy efficiency optimization method for an IRS-assisted NOMA THz network according to claim 3, wherein in Step 2, the channel model for the IRS users is specifically as follows:

a channel for the IRS users is composed of a channel from the BS to an IRS, a channel from the IRS to the users, and a phase shift of IRS elements; according to a classical S-V model, assume a channel vector reflected by an IRS i to a $k^{th}$ user in an $m^{th}$ cluster is defined as:

$$H=H^I \Phi H^B$$

where, $H^B$ represents channel attenuation from the BS to the IRS, $H^I$ represents channel attenuation from the IRS to the users; $\Phi$ is a G×G diagonal matrix, represents the phase shift of the IRS elements and meets $\Phi=\text{diag}([e^{j\varphi_1}, \ldots, e^{j\varphi_G}])$, where $\varphi_g$ represents the phase shift of a $g^{th}$ element; $H^B$ is expressed as:

$$H^B = A^{I_1} \text{diag}(\alpha) A^{B*}$$

where $$\alpha = \sqrt{N_B G/L_1}[\alpha_1, \ldots, \alpha_{l_1}, \ldots, \alpha_{L_1}]^*$$

$$A^B = [\alpha^B(\phi_1), \ldots, \alpha^B(\phi_{l_1}), \ldots, \alpha^B(\phi_{L_1})]$$

$$A^{I_1} = [\alpha^{I_1}(\gamma_1^A), \ldots, \alpha^{I_1}(\gamma_{l_1}^A), \ldots, \alpha^{I_1}(\gamma_{L_1}^A)]$$

Where, $L_1$ represents the number of scattering paths from the BS to the IRS, $\alpha_{l_1}$ is a complex gain from the path loss of a path $l_1$, $\phi_{l_1} \in [0, 2\pi]$ and $\gamma_{l_1}^A \in [0, 2\pi]$ represent a departure angle and an arrival angle on the path $l_1$ from the BS to the IRS; here, uniform linear array are considered, and $\alpha^B(\phi_{l_1})$ and $\alpha^{I_2}(\gamma_{l_1}^A)$ represent array response vectors at the BS and the IRS and are expressed as:

$$\alpha^B(\phi_{l_1}) = \frac{1}{\sqrt{N_B}}\left[1, e^{j(2\pi/\lambda)d\,\sin(\phi_{l_1})}, \ldots, e^{j(N_b-1)(2\pi/\lambda)d\,\sin(\phi_{l_1})}\right]^*$$

$$\alpha^{I_1}(\gamma_{l_1}^A) = \frac{1}{\sqrt{G}}\left[1, e^{j(2\pi/\lambda)d\,\sin(\gamma_{l_1}^A)}, \ldots, e^{j(G-1)(2\pi/\lambda)d\,\sin(\gamma_{l_1}^A)}\right]^*$$

where, $\lambda$ is a wavelength of THz signals, and d is a distance between adjacent antenna elements or IRS elements;

similar to a BS-IRS link, a IRS-user channel is formulated as:

$$H^I = A^U \text{diag}(\beta) A^{I_2*}$$

where, $$\beta = \sqrt{N_U G/L_2}[\beta_1, \ldots, \beta_{l_1}, \ldots, \beta_{L_1}]^*$$

$$A^U = [\alpha^U(\psi_1), \ldots, a^U(\psi_{l_2}), \ldots, a^U(\psi L_2)]$$

$$A^{I_2} = [\alpha^{I_2}(\gamma_1^D), \ldots, \alpha^{I_2}(\gamma_{l_2}^D), \ldots, \alpha^{I_2}(\gamma_{L_2}^D)]$$

where, $L_2$ represent the number of scattering paths from the BS to the IRS, $\psi_{l_2}$ is a complex gain from the path loss of a path $l_2$, and $\psi_{l_2} \in [0, 2\pi]$ and $\gamma_{l_2}^D \in [0, 2\pi]$ represent a departure angle and an arrival angle on the path $l_2$ from the IRS to the BS; here, uniform linear arrays are considered, and $\alpha^U(\psi_{l_2})$ and $\alpha^{I_2}(\gamma_{l_2}^D)$ are expressed as:

$$\alpha^U(\psi_{l_2}) = \frac{1}{\sqrt{N_U}}\left[1, e^{j(2\pi/\lambda)d\,\sin(\psi_{l_2})}, \ldots, e^{j(N_U-1)(2\pi/\lambda)d\,\sin(\psi_{l_2})}\right]^*$$

$$\alpha^{I_2}(\gamma_{l_2}^D) = \frac{1}{\sqrt{G}}\left[1, e^{j(2\pi/\lambda)d\,\sin(\gamma_{l_2}^D)}, \ldots, e^{j(G-1)(2\pi/\lambda)d\,\sin(\gamma_{l_2}^D)}\right]^*$$

so, IRS-user channel is:

$$H = A^U \text{diag}(\beta) A^{I_2*} \Phi A^{I_1} \text{diag}(\alpha) A^{B*}$$

for the sake of brevity, assume $N_B=1$ and $N_U=1$, the vector H is composed of a vector representing a channel gain $h_{i,m,k,n}^I$ of the $k^{th}$ user in the $m^{th}$ cluster on the sub-channel n; $P_{i,m,k,n}^I$ represents power transmitted to the $k^{th}$ user in the $m^{th}$ cluster on the sub-channel n; a signal received by the $k^{th}$ user in the $m^{th}$ cluster on the sub-channel n is expressed as:

$$y_{i,m,k,n}^I = h_{i,m,k,n}^I p_{i,m,k,n}^I + h_{i,m,k,n}^I \sum\nolimits_{n'=n-1, n' \neq n}^{n'=n+1} p_{i,m,k,n}^I + h_{i,m,k,n}^I \sum\nolimits_{k'=1}^{k'=k-1} p_{i,m,k,n}^I + \sigma^2.$$

5. The energy efficiency optimization method for an IRS-assisted NOMA THz network according to claim 4, wherein in Step 3,
the BS user rate is calculated:
wherein, a signal to noise ratio for signal reception of a BS user l is:

$$SINR_{l,m}^B = \frac{h_{l,n}^B p_{l,n}^B}{h_{l,n}^B \sum\nolimits_{k'=1, l' \neq l}^{L} \sum\nolimits_{n'=n-1, n' \neq n}^{n+1} p_{l',n'}^B + \sigma^2}$$

by a Shannon equation, a rate of the user l is expressed as:

$$R_l^B = B \sum_{n=1}^{L} \log_2\left(1 + SINR_{l,n}^B\right)$$

where, B is a bandwidth;
the IRS user rate is calculated:
wherein, a signal to noise ratio of the $k^{th}$ user in the $m^{th}$ cluster is:

$$SINR_{i,m,k,n}^I = \frac{h_{i,m,k,n}^I p_{i,m,k,n}^I}{h_{i,m,k,n}^I \sum\nolimits_{n'=n-1, n' \neq n}^{n'=n+1} p_{i,m,k,n}^I + h_{i,m,k,n}^I \sum\nolimits_{k'=1}^{k'=k-1} p_{i,m,k,n}^I + \sigma^2}$$

the rate is expressed as:

$$R_{i,m,k}^I = B \Sigma_{n=1}^{L+IMK} \log_2(1+SINR_{i,m,k,n}^I)$$

the total rate of the system is expressed as:

$$R = \Sigma_{l=1}^{L} R_l^B + \Sigma_{i=1}^{I} \Sigma_{m=1}^{M} \Sigma_{k=1}^{K} R_{i,m,k}^I.$$

6. The energy efficiency optimization method for an IRS-assisted NOMA THz network according to claim 5, wherein in Step 4,
to maximize overall energy efficiency of a network, the optimization problem for downlink power control and the IRS phase shift adjustment is proposed, wherein total transmission power of the BS is calculated as the sum power of all the users by:

$$P = \sum_{l=1}^{L} \sum_{n=1}^{L} p_{l,n}^B + \sum_{i=1}^{I} \sum_{m=1}^{M} \sum_{k=1}^{K} \sum_{n=L+1}^{L+IMK} p_{i,m,k,n}^I$$

the energy efficiency of the system network is defined as a ratio of a sum rate to the total power of the network, and the optimization problem is formulated as:

$$\max_{\varphi_{i,m,g}, p_{i,m,k,n}^I, p_{l,n}^B} EE = \frac{R}{P}$$

$C_1: 0 < p_{i,m,k,n}^I < P_T, \forall i \in \mathcal{I}, \forall m \in \mathcal{M}, \forall k \in \mathcal{K}, \forall n \in \mathcal{N}$ $C_2: 0 < p_{l,n}^B < P_T, \forall l \in \mathcal{L}, \forall n \in \mathcal{N}$ -continued $C_3: R_{i,m,k}^I \geq R_{min}, \forall i \in \mathcal{I}, m \in \mathcal{M}, k \in \mathcal{K}$ $C_4: R_l^B \geq R_{min}, \forall l \in \mathcal{L}$ $C_5: \varphi_{i,m,g} \in [0, 2\pi], \forall i \in \mathcal{I}, \forall m \in \mathcal{M}, \forall g \in \mathcal{G}$ where, $C_1$ and $C_2$ are power limitations of each user, $C_3$ and $C_4$ are minimum rate requirements, and is an angle range.

7. The energy efficiency optimization method for an IRS-assisted NOMA THz network according to claim 6, wherein in Step 5,
the optimization problem is solved through the MADRL method: virtual agents are introduced into the BS as mappings of the users, and the virtual agents perform training to obtain optimal power and phase shift; a central control unit is configured on the BS to collect user information including channel state information (CSI), phase shift and power; a clock is set to ensure synchronous iteration during agent training, so that overall energy efficiency is calculated after each iteration; and the agents perform training according to the collected user information and real-time iteration results to realize global optimization.

8. The energy efficiency optimization method for an IRS-assisted NOMA THz network according to claim 7, wherein a Markov process taking a discrete time, a finite state space and an action space into account is used for training; basic elements of reinforcement learning are represented by a tuple ($\mathcal{S}$, $\mathcal{A}$, $\mathcal{R}$, $\mathcal{P}$), where $\mathcal{S}$ represents a state space, $\mathcal{A}$ represents an action space, $\mathcal{R}$ represents a reward function, and $\mathcal{P}$ represents a state transition probability; and the state space and the action space are set as follows:

1) state space: a tuple ($\varphi$, p) is defined to represent an angle of the IRS elements and the power of the BS users and the IRS users, and the state space is expressed by a formula $\mathcal{S} = \{s|s=(\varphi, p)\}$, wherein $\varphi = \{\varphi_1, \ldots, \varphi_j, \ldots, \varphi_G\}$;

2) action space: in order to obtain the finite space, the angle and the power are discretized by;

$$\varphi_j: \left\{0, \left\{\varphi_{min}\left(\frac{\varphi_{max}}{\varphi_{min}}\right)^{\frac{i}{|\varphi|-2}} \mid i = 0, \ldots, |\varphi|-2\right\}\right\}$$

$$\varphi: \left\{0, \left\{P_{min}\left(\frac{P_{max}}{P_{min}}\right)^{\frac{i}{|P|-2}} \mid i = 0, \ldots, |P|-2\right\}\right\}$$

wherein, $\varphi_{min}$ and $\varphi_{max}$ are a minimum phase and a maximum phase of the IRS elements, $P_{min}$ and $P_{max}$ are minimum user power and maximum user power, and a discrete quantity of the angle and a discrete quantity of the power are $|\varphi|$ and $|P|$ respectively; the action space is formed as $\mathcal{A} = \{a|a=(\varphi, p)\}$;

3) reward space: a difference between the overall energy efficiency in a current state and the overall energy efficiency in a previous state is defined as a reward, which is presented as:
$\mathcal{R} = EE_{t+1} - EE_t$, wherein $EE_{t+1}$ and $EE_t$ are energy efficiency in a state $s_{t+1}$ and energy efficiency in a state $s_t$ respectively;

an optimal strategy $\pi$ is obtained by the agents to realize a maximum cumulative reward, which is obtained by:

$$R_t \triangleq \sum_{t=0}^{\infty} \gamma^t r_{t+1}$$

where, $\gamma \in (0,1]$ is a discount factor for future rewards;

during training, the agents select an action according to the optimal strategy $\pi$; at the state $s_t$, the agents take an action $\alpha_t$ according to the optimal strategy $\pi$, and at this moment, an action-value function $Q_\pi(s_t, \alpha_t)$ of the agents is expressed as:

$$Q_\pi(s_t, \alpha_t) \triangleq E_\pi[R_t | s = s_t, \alpha = \alpha_t]$$

According to a Bellman equation, $$Q^*(s, a) \triangleq E\left[r_t + \gamma \max_{a'} Q^*(s', a') \mid s = s_t, a = a_t\right]$$

an evaluation of the optimal strategy is expressed as:

$$Q^*(s, a) \triangleq \max_{a \in \mathcal{A}} Q^\pi(s, a)$$

the optimal strategy is obtained by:

$$\pi^* = \arg \max_{a \in \mathcal{A}} Q^*(s, a)$$

to search an optimal strategy in a large state space and a large action space, a DQN is introduced into MADRL; the optimal strategy and the value function are approximated as a one function according to $Q_i(s, \alpha; \theta) \approx Q^*(s, \alpha)$, where $\theta$ is a weight and is updated by training; the DQN comprises a target network and a current network, which are trained by minimizing a loss function to optimize the parameter $\theta$; the loss function is:

$$\text{loss}(\theta) = (y_t^{DQN} - Q_t(s_t, \alpha_t; \theta))^2$$

where, $Q_t(s_t, \alpha_t; \theta)$ is an output of the neural network with the parameter is $\theta$ at the state $s_t$, and $y_t^{DQN}$ is an output of the target network with the parameter is $\hat{\theta}$ at the state $s_{t+1}$;

$$y_t^{DQN} = r_t + \gamma \max_{a_{t+1} \in \mathcal{A}} Q(s_{t+1}, a_{t+1}; \hat{\theta})$$

the loss function is minimized through a gradient descent algorithm, and the action-value function is approximated by the neural network until convergence.

9. The energy efficiency optimization method for an IRS-assisted NOMA THz network according to claim 8, wherein an action-value function Q is, a target action-value function $\hat{\theta} = \theta$, an index T for iteration and an experience pool $\mathcal{D}$ are generated according to the random parameter $\theta$;

for episode=1 to M
1) initializing the state $s_t$
2) for t=1 to T
   a. selecting an action by the agents according to $$= \arg \max_{a \in \mathcal{A}} Q^*(s_t, a_t; \theta);$$

b. performing the action $\alpha_t$ by the agents to switch from the current state $s_t$ to the next state $s_{t+1}$;
   c. obtaining the reward $r_t$ through data exchange between the agents and the central control unit;
   d. forming a tuple $(s_t, \alpha_t, r_t, s_{t+1})$ by $s_t, \alpha_t, r_t, s_{t+1}$, and saving the tuple $(s_t, \alpha_t, r_t, s_{t+1})$ the experience pool $\mathcal{D}$;
   e. randomly selecting a mini-batch tuple $(s_t, \alpha_t, r_t, s_{t+1})$ from the experience pool $\mathcal{D}$;
   f. calculating $y_t^{DQN}$ according to $$y_t^{DQN} = r_t + \gamma \max_{a_{t+1} \in \mathcal{A}} Q(s_{t+1}, a_{t+1}; \hat{\theta});$$

g. updating the parameter $\theta$ in $\text{loss}(\theta) = (y_t^{DQN} - Q_t(s_t, \alpha_t; \theta))^2$ through a gradient descent method;
   h. assigning $\theta$ to $\hat{\theta}$ to update $\theta$ every a period of time, that is $\hat{\theta} = \theta$;
   i. calculating energy efficiency $EE_t$ by the central control unit;
   j. calculating the reward according to $r_t = EE_{t+1} - EE_t$;
ending the cycle.

* * * * *